US008725644B2

(12) United States Patent  (10) Patent No.: US 8,725,644 B2
Schlesser et al.  (45) Date of Patent: May 13, 2014

(54) SECURE ONLINE TRANSACTION PROCESSING

(75) Inventors: Joshua Schlesser, La Jolla, CA (US); Douglas Johnson, Coquitlam (CA)

(73) Assignee: The Active Network, Inc., San Diego, CA (US)

( * ) Notice: Subject to any disclaimer, the term of this patent is extended or adjusted under 35 U.S.C. 154(b) by 147 days.

(21) Appl. No.: 13/016,809

(22) Filed: Jan. 28, 2011

(65) Prior Publication Data

US 2012/0197807 A1   Aug. 2, 2012

(51) Int. Cl.
   *G06F 21/00*   (2013.01)
(52) U.S. Cl.
   USPC .............................................. 705/52; 705/54
(58) Field of Classification Search
   USPC ................... 705/35, 52, 60; 713/184
   See application file for complete search history.

(56) References Cited

U.S. PATENT DOCUMENTS

| | | | |
|---|---|---|---|
| 5,991,738 A | 11/1999 | Ogram | |
| 6,000,832 A * | 12/1999 | Franklin et al. | 700/232 |
| 6,332,134 B1 | 12/2001 | Foster | |
| 6,941,285 B2 * | 9/2005 | Sarcanin | 705/67 |
| 7,044,390 B2 * | 5/2006 | Leaming | 235/492 |
| 7,111,051 B2 * | 9/2006 | Nobakht et al. | 709/217 |
| 7,131,578 B2 * | 11/2006 | Paschini et al. | 235/379 |
| 7,168,065 B1 * | 1/2007 | Naccache et al. | 717/127 |
| 7,299,292 B2 * | 11/2007 | Morten et al. | 709/231 |
| 7,380,117 B2 * | 5/2008 | Baker | 713/153 |
| 7,418,101 B2 * | 8/2008 | Nobel et al. | 380/243 |
| 7,438,226 B2 * | 10/2008 | Helsper et al. | 235/382 |
| 7,457,778 B2 | 11/2008 | Li et al. | |
| 7,497,374 B2 * | 3/2009 | Helsper et al. | 235/380 |
| 7,526,652 B2 * | 4/2009 | Ziegler | 713/184 |
| 7,543,740 B2 * | 6/2009 | Greene et al. | 235/380 |
| 7,645,194 B2 * | 1/2010 | Van Luchene et al. | 463/25 |
| 7,657,497 B2 * | 2/2010 | Nandy | 706/45 |
| 7,673,793 B2 * | 3/2010 | Greene et al. | 235/380 |
| 7,707,120 B2 * | 4/2010 | Dominguez et al. | 705/78 |
| 7,708,200 B2 * | 5/2010 | Helsper et al. | 235/383 |
| 7,734,771 B2 * | 6/2010 | Watson et al. | 709/224 |
| 7,749,080 B2 * | 7/2010 | Szrek et al. | 463/29 |
| 7,787,859 B2 * | 8/2010 | Koskinen et al. | 455/406 |
| 7,822,854 B2 * | 10/2010 | Kano | 709/224 |
| 7,827,115 B2 * | 11/2010 | Weller et al. | 705/78 |
| 7,827,603 B1 * | 11/2010 | Lan et al. | 726/14 |
| 7,865,931 B1 * | 1/2011 | Stone et al. | 726/1 |
| 7,949,867 B2 * | 5/2011 | Deshpande et al. | 713/150 |
| 7,949,869 B2 * | 5/2011 | Deshpande et al. | 713/150 |
| 7,991,701 B2 * | 8/2011 | Weller et al. | 705/78 |
| 8,019,691 B2 * | 9/2011 | Dominguez et al. | 705/78 |

(Continued)

OTHER PUBLICATIONS

TC Trustee Merchant Host Developer's Guide Version 1.0.5; Trust Commerce, prepared by ARian Maybod, last revision Jul. 13, 2010; 12 pages.

*Primary Examiner* — Evens J Augustin
(74) *Attorney, Agent, or Firm* — Stetina Brunda Garred & Brucker

(57) ABSTRACT

Various methods for securely processing an online transaction between a customer and a merchant are disclosed. In one method, an authentication credentials request that includes a transaction identifier is received from a merchant system. In response, an encryption key is transmitted to the merchant system. From a customer system, the personal account data associated with the customer is received, which is encrypted with the encryption key. A transaction processing request from the merchant system prompts the generating of a transaction processing response based upon its execution.

18 Claims, 6 Drawing Sheets

(56) References Cited

U.S. PATENT DOCUMENTS

| | | | |
|---|---|---|---|
| 8,019,996 B2 * | 9/2011 | Hashimoto et al. | 713/169 |
| 8,055,894 B2 * | 11/2011 | Baker et al. | 713/153 |
| 8,078,142 B2 * | 12/2011 | Koskinen et al. | 455/406 |
| 8,090,600 B2 * | 1/2012 | Ziade et al. | 705/4 |
| 8,243,924 B2 * | 8/2012 | Chen et al. | 380/217 |
| 8,271,395 B2 * | 9/2012 | Dominguez et al. | 705/65 |
| 8,321,341 B2 * | 11/2012 | Nandy | 705/39 |
| 8,353,018 B2 * | 1/2013 | McMillan et al. | 726/6 |
| 8,386,771 B2 * | 2/2013 | Baker et al. | 713/153 |
| 8,474,698 B1 * | 7/2013 | Billett et al. | 235/379 |
| 8,494,937 B2 * | 7/2013 | Berntsen et al. | 705/35 |
| 8,577,795 B2 * | 11/2013 | Clubb et al. | 705/39 |
| 8,594,286 B2 * | 11/2013 | New et al. | 379/93.12 |
| 8,606,720 B1 * | 12/2013 | Baker et al. | 705/76 |
| 8,621,642 B2 * | 12/2013 | Bjorn et al. | 726/26 |
| 2002/0018585 A1 * | 2/2002 | Kim | 382/125 |
| 2002/0128981 A1 | 9/2002 | Kawan et al. | |
| 2003/0145205 A1 * | 7/2003 | Sarcanin | 713/172 |
| 2005/0149435 A1 | 7/2005 | Petit et al. | |
| 2009/0076966 A1 * | 3/2009 | Bishop et al. | 705/67 |
| 2009/0222383 A1 * | 9/2009 | Tato et al. | 705/71 |

* cited by examiner

SECURE ONLINE TRANSACTION PROCESSING

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to electronic commerce, and more particularly to secure online transaction processing.

2. Related Art

E-commerce, and specifically online shopping, is long established as viable sales outlet, due in part to its convenience, ready availability of information for purchase decision-making, lower prices, and greater variety in the selection of available goods and services. Generally, customers visit merchants' websites using a personal computer having a connection to the Internet as well as a web browser application. The merchant websites have visual representations of the products and/or services being sold, along with descriptions therefor. The visual appearance and interactive features are designed to mimic, as closely as possible, the experience of shopping in a physical store. After selecting the desired goods and storing them in a "shopping cart," the customer exchanges payment information with the merchant website. Various electronic payment modalities are known in the art, including credit cards, debit cards, gift cards, postal money orders, and personal checks, as well as those involving third party processors such as PayPal®. Upon successfully rendering payment to the merchant with these modalities, the merchant ships the ordered product(s) or performs the requested service(s).

As is the case with any marketplace, there are numerous types of online stores that vary significantly in size. The largest retailers with the widest product offerings sell many different items from books, music, and movies to sporting goods, to home furnishings, and so forth. These online stores typically process payments internally because transaction volumes are large enough to justify the significant expenses of purchasing and maintaining the necessary information technology (IT) infrastructure including secured servers, server-side encryption technologies, connections to credit card processing networks, and the like. However, for smaller online stores, such as those of one manufacturer, those dealing in a limited number of small market segment, and the like, these additional costs associated with internal payment processing may be prohibitively expensive, especially when transaction volumes are much lower. Furthermore, to the extent that personal account number (PAN) data such as bank account numbers, credit card numbers, expiration dates, and security codes from customers are handled, there must be systems and procedures in place for compliance with the Payment Card Industry (PCI) standards. Non-compliance can subject the merchant to fines, legal action, and exclusion from credit card processing networks.

To avoid difficulties associated with infrastructure setup and continual PCI compliance, such smaller online stores typically outsource payment processing to third parties. In a basic implementation, online stores maintain the shopping cart functionality, and upon the customer selecting the "checkout" function, the browser application is redirected to the third party payment processor, with the total remittance amount being passed during the redirect. The customer enters his/her PAN into a form generated by the third party processor, and securely transmitted thereto. In this way, the merchant can remain detached from any potential security concerns associated with the handling PAN data. After successful payment, the customer is redirected back to the merchant site, usually just to a simple, generic information page that the transaction was completed and the delivery of the ordered good and/or services was forthcoming.

Despite its convenience for the merchant, there are several disadvantages associated with utilizing third party payment processors. Because the merchant site and the third party payment processor site are, by definition, maintained by separate entities, the overall user experience, including the "look and feel" of the interface, can be inconsistent. In particular, the branding of the merchant is lost during the payment processing stage. Furthermore, integration with the other e-commerce components of the merchant such as inventory management, customer relationship management, and accounting was cumbersome at best and difficult to implement. Although some further efforts in the field led to variations of redirecting the customer to the third party payment processors, such redirect functions are known to be inefficient. Accordingly, there is a need in the art for improved secure online transaction processing.

BRIEF SUMMARY

In accordance with one embodiment of the present disclosure, a method for securely processing an online transaction between a customer and a merchant is contemplated. The method may begin with a step of receiving from a merchant system an authentication request that includes a transaction identifier associated with the online transaction. Then, the method may include transmitting an encryption key to the merchant system in response to the received authentication request. The encryption key may correspond to the transaction identifier. There may also be a step of receiving, from a customer system, the personal account data associated with the customer. The personal account data may be encrypted with the encryption key. The method may include receiving, from the merchant system, a transaction processing request including the transaction identifier. Furthermore, there may be a step of generating a transaction processing response to the merchant system based upon an execution of the transaction processing request.

According to a second embodiment of this disclosure, another method for securely processing an online transaction between a customer and a merchant is contemplated. This method may include receiving, from a customer system, a transaction submission request for the online transaction. The transaction submission request may include at least one purchase item identifier with a purchase price associated therewith. Additionally, there may be a step of transmitting an authentication request to a payment processing system in response to the receipt of the transaction submission request. The authentication request may include a transaction identifier associated with the specific received transaction submission request. Furthermore, a step of receiving an encryption key may be included. There may also be included a step of transmitting a payment information page with the transaction identifier. The payment information page may be transmitted to the customer system. The method may further include receiving transaction data entered into the payment information page, in which the transaction data may correspond to the transaction identifier. A step of transmitting a transaction processing request including the transaction identifier may be provided, and this transmission may be directed to the payment processing system. There may also be a step of generating a transaction processing response to the customer system based upon results for the transaction processing request to the payment processing system.

In yet another embodiment of the present disclosure, there may be a method for securely processing an online transaction between a customer and a merchant. The method may include transmitting a transaction submission request to a merchant system. The transaction submission request for the online transaction may include at least one purchase item identifier with a purchase price associated therewith. There may also be a step of receiving a payment information form including an encryption key from the merchant system. The encryption key may correspond to a transaction identifier for the online transaction. Furthermore, there may be a step of receiving personal account data and transaction data entered into the payment information form. The method may include encrypting the personal account data with the received encryption key. This step may be followed by transmitting the encrypted personal account data to a payment processing system. A step of transmitting the transaction data to the merchant system may also be included.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of securely processing an online transaction between a customer and a merchant, and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first and second and the like are used solely to distinguish one entity from another without necessarily requiring or implying any actual such relationship or order between such entities.

Figure 1:
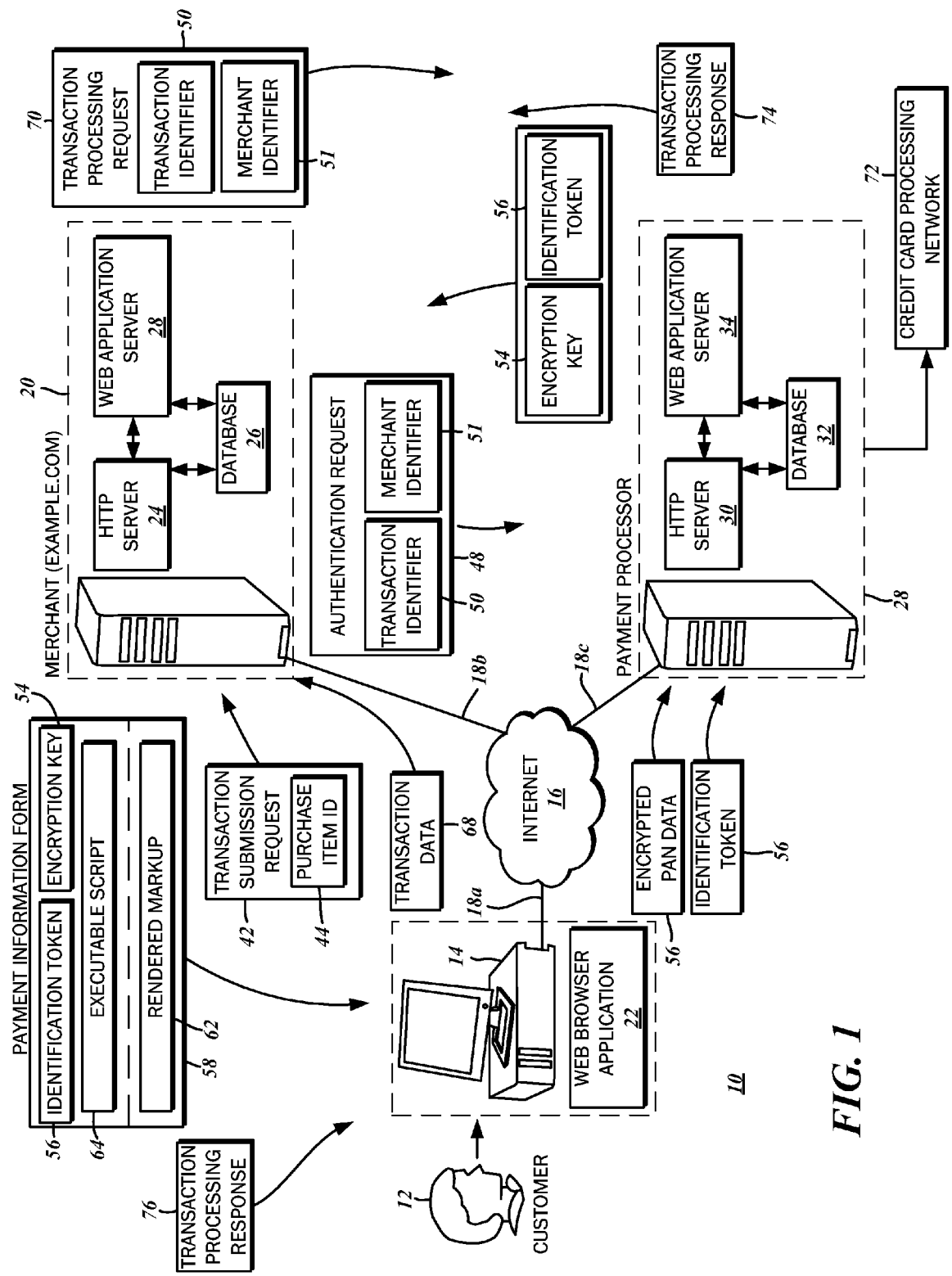
FIG. 1 is a block diagram illustrating an environment in which various embodiments of the present disclosure may be implemented.

With reference to the block diagram of FIG. 1, it is contemplated that various embodiments of methods for securely processing an online transaction can be utilized or implemented in the context of an exemplary e-commerce environment 10. A customer 12 utilizes a computer system 14 to access the Internet 16 via a customer Internet link 18a. Additionally, a merchant computer system 20 is connected to the Internet 16 via a merchant Internet link 18b. It is understood that the customer computer system 14 can establish a bi-directional data communications link with the merchant computer system 20 over the Internet 16 and the respective Internet links 18a, 18b.

The customer computer system 14, also interchangeably referenced as the client system, may be a conventional computer system with a central processing unit, memory, various input and output devices such as keyboards, mice, and display units. Different variations of the computer system including desktops, laptops, tablets, smart phones and the like may be substituted, though any such device is understood to be connectable to the Internet 16 over the Internet link 18a as noted above. Computer-executable software instructions of a web browser application 22, as well as those implementing the contemplated methods, may be stored on the customer system 14. As will be described in greater detail below, the web browser application 22 is understood to communicate with web servers over the hypertext transfer protocol (HTTP) to request and receive data. However, for improved security, some data transfers may utilize the HTTP Secure (HTTPS) protocol, where a Secure Sockets Layer/Transport Layer Security (SSL/TLS) connection is utilized to encrypt all traffic between network nodes. Notwithstanding the specific reference to the HTTPS protocol, it will be recognized that any other suitable communications protocol may be utilized between the merchant system 20 and the customer system 14.

It is understood that while the present disclosure references the web browser application 22, HTTP protocols for communication, and so forth, the implementation of the contemplated methods are not limited thereto. Any other suitable e-commerce client application with attendant communications modalities, whether currently known or unknown, may be substituted without departing from the scope of the present disclosure.

Such web servers include the aforementioned merchant computer system 20, also referenced interchangeably herein as the merchant system. The merchant system 20 is likewise understood to be a computer system that includes a central processor, a memory, and input/output devices, though loaded with computer-executable software instructions of a web server and those that implement one or more of the disclosed methods for securely processing an online transaction. In further detail, the merchant system 20 includes an HTTP server 24, along with a database 26 that stores, for example, product catalog data. There also is a web application server 27 that executes the functionality of the contemplated methods. The division of the components of the merchant system 20, that is, the HTTP server 24, the database 26, and the web application server 27, is for the purposes of illustrating its different functional blocks, and is not intended to be limiting. It will be recognized by those having ordinary skill in the art that there are numerous ways in which a merchant system 20 can be configured using a different commercial, off-the-shelf hardware and software components.

Figure 2:
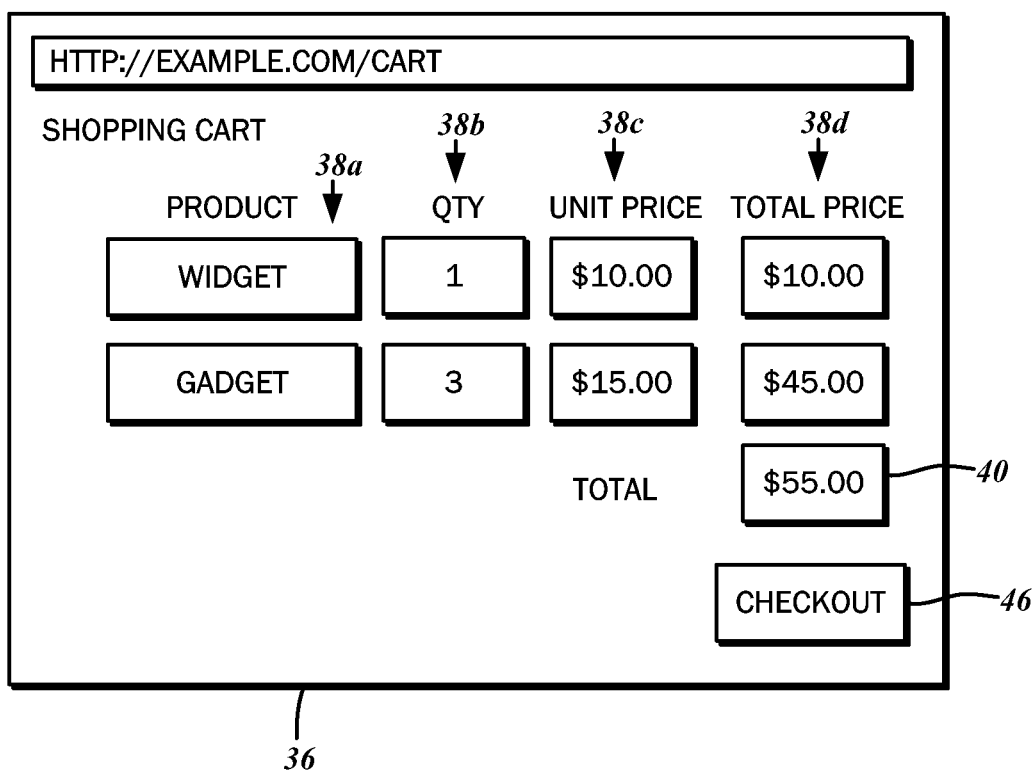
FIG. 2 is an exemplary user interface for a shopping cart feature of an e-commerce website.

A basic e-commerce transaction typically involves just the customer system 14 and the merchant system 20, though according to the various embodiments of the present disclosure, certain aspects of the transaction are handled by a payment processor computer system 28, also interchangeably referenced as the payment processor system. Like the merchant system 20, the payment processor system 28 includes a computer system with a central processor, a memory, and input/output devices. The payment processor system 28 is loaded with computer-executable software instructions of a web server, as well as those that implement the methods for securely processing an online transaction. In this regard, an Internet link 18c connects the payment processor system 28 to the Internet 16, and to the customer system 14. Again, there is an HTTPS server 30 that cooperates with a database 32 and a web application server 34 that performs various functions in accordance with the contemplated methods of the present disclosure. The payment processor system 28 is understood to communicate with both the customer system 14 and the merchant system 20, and while In the context of the above-described e-commerce environment 10, several methods for securely processing an online transaction between the customer 12 and the merchant system 20 will be described. As will be recognized, the customer 12, using the web browser application 22, navigates a conventional web-based product catalog or shopping system implemented on the merchant system 20. Selected products in the catalog may be added to a simulated shopping cart, with an exemplary user interface 36 therefor being shown in FIG. 2. The merchant system 20 has a Uniform Resource Locator (URL) of "example.com," per domain naming conventions of the Internet 16, and with the customer 12 navigating the merchant system 20, the web browser application 22 indicates thus in the user interface 36. In general, the shopping cart is a listing of the selected products from the catalog. More particularly, a first column 38a identifies each of the selected products by name or other descriptor, and a second column 38b identifies the quantity of each product selected. The per-unit purchase price is indicated in a third column 38c, while the total price for each product selected is set forth in a fourth column 38d. At the bottom of the listing, a sum 40 totaling all of the prices for each product is provided. Those having ordinary skill in the art will recognize that there are numerous ways in which a shopping cart function on an e-commerce website can be implemented, and the foregoing is by way of example only and not of limitation.

Figure 3:
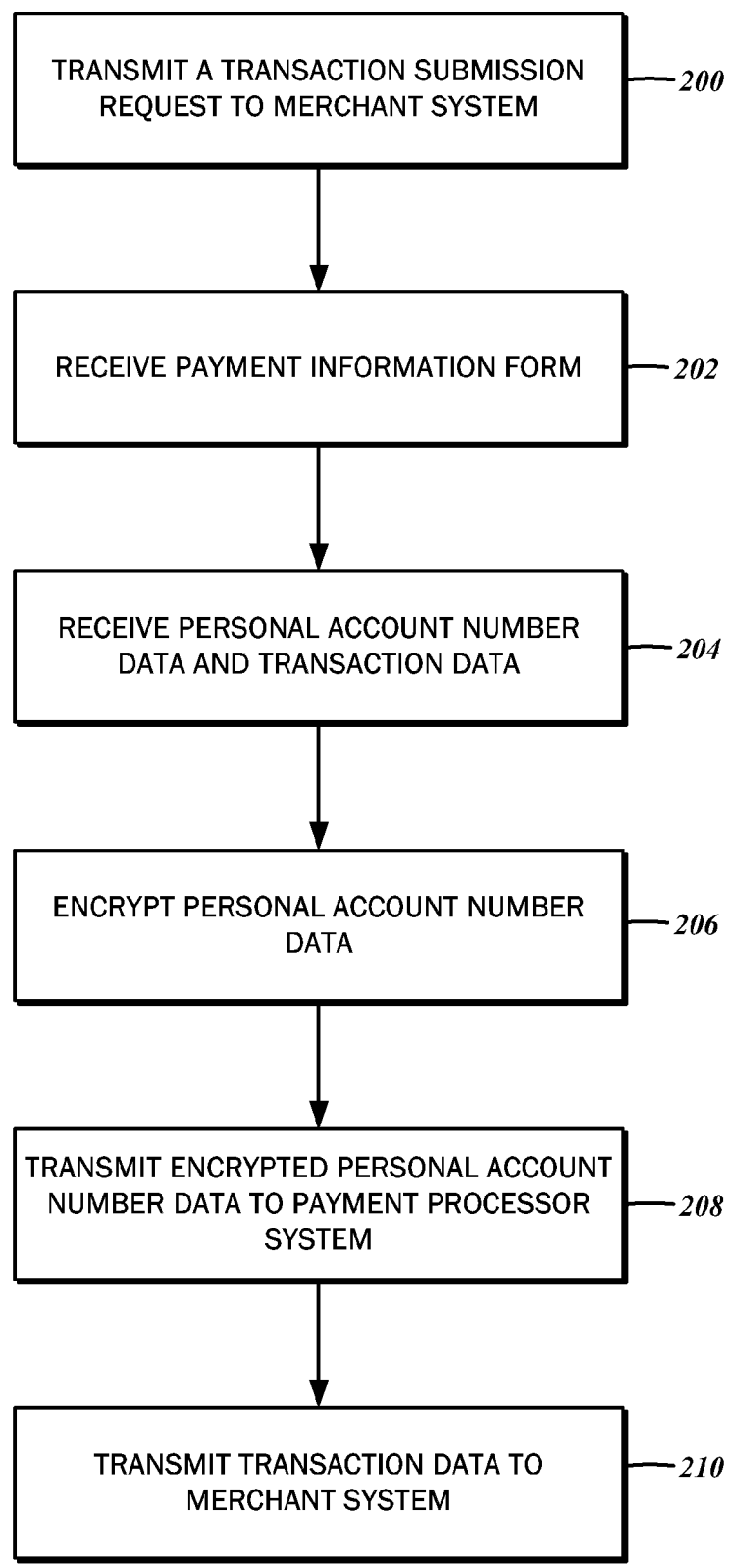
FIG. 3 is a flowchart showing one embodiment of a method for securely processing an online transaction as implementable on a customer system.

Referring now to the flowchart of FIG. 3 as well as the block diagram of FIG. 1, one embodiment of the method for securely processing an online transaction, from the perspective of the customer system 14, begins with a step 200 of transmitting a transaction submission request 42 to the merchant system 20. The transaction submission request 42 is understood to include the selected product or products 44 saved in the shopping cart. As indicated above, the selected product has a corresponding purchase item identifier 44, which may be an internal reference number, a name of the product, or any other suitable reference is indexed in the merchant system 20. The selected product is understood to have a purchase price associated therewith, and is also indexed in the merchant system 20 together with the corresponding purchase item identifier 44. Upon the customer 12 selecting a "checkout" button 46 on the shopping cart user interface 36, the step 200 can be initiated. Essentially, the contents of the shopping cart are submitted to the merchant system 20 for purchase.

Figure 4:
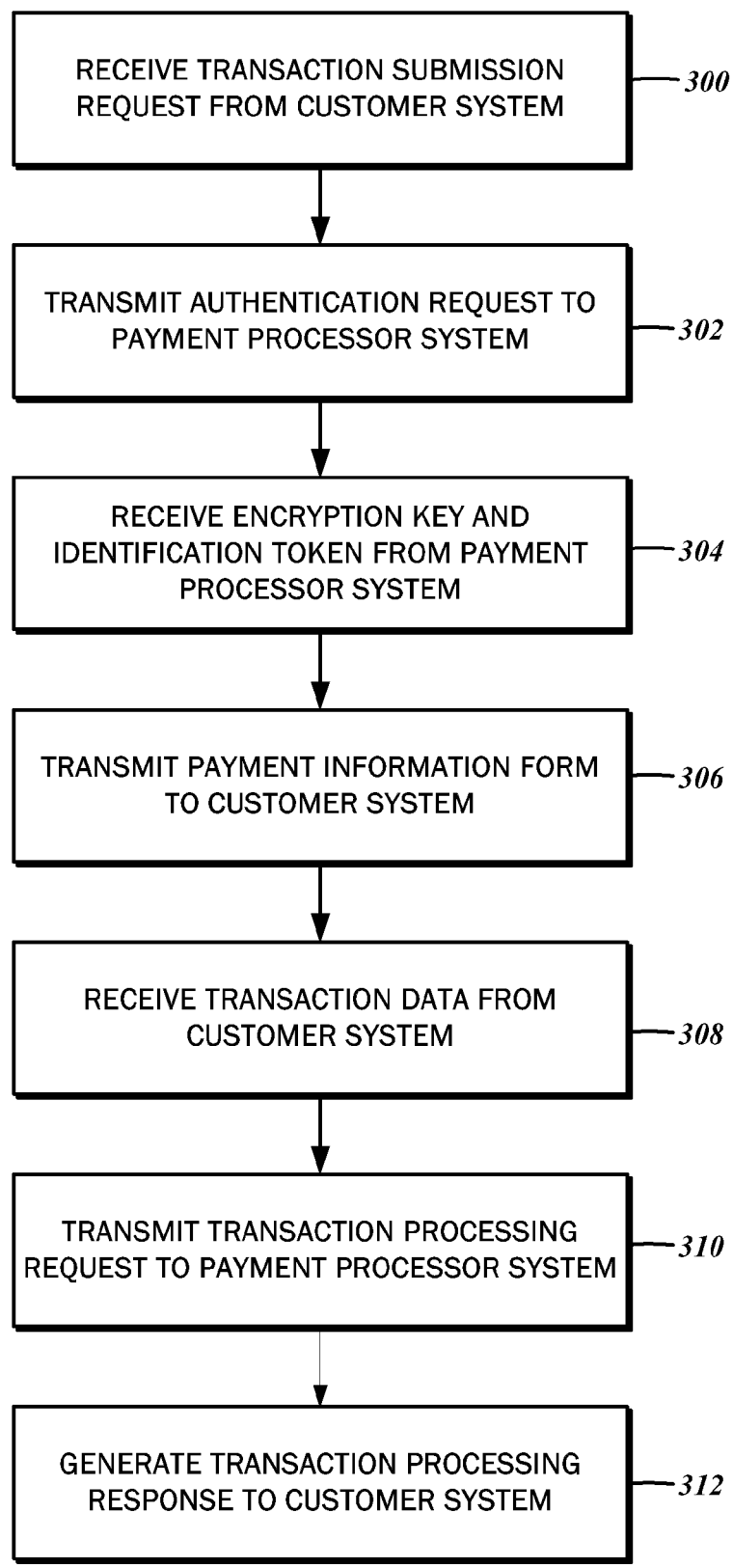
FIG. 4 is a flowchart showing one embodiment of a method for securely processing an online transaction as implementable on a merchant system.

With reference to the flowchart of FIG. 4, another embodiment of the method for securely processing the online transaction, from the perspective of the merchant system 20, begins with a reciprocal step 300 of receiving the transaction submission request 42 from the customer system 14. When the transaction submission request 42 is received, the method continues with a step 302 of transmitting an authentication request 48 to the payment processor system 28. The transaction submission request 42 includes a transaction identifier 50 that, within the merchant system 20, specifically identifies the current transaction of concern and the corresponding transaction submission request 42. Furthermore, the transaction submission request 42 may also include a merchant identifier 51 for indicating the specific merchant system 20 with which the transaction is associated.

Figure 5:
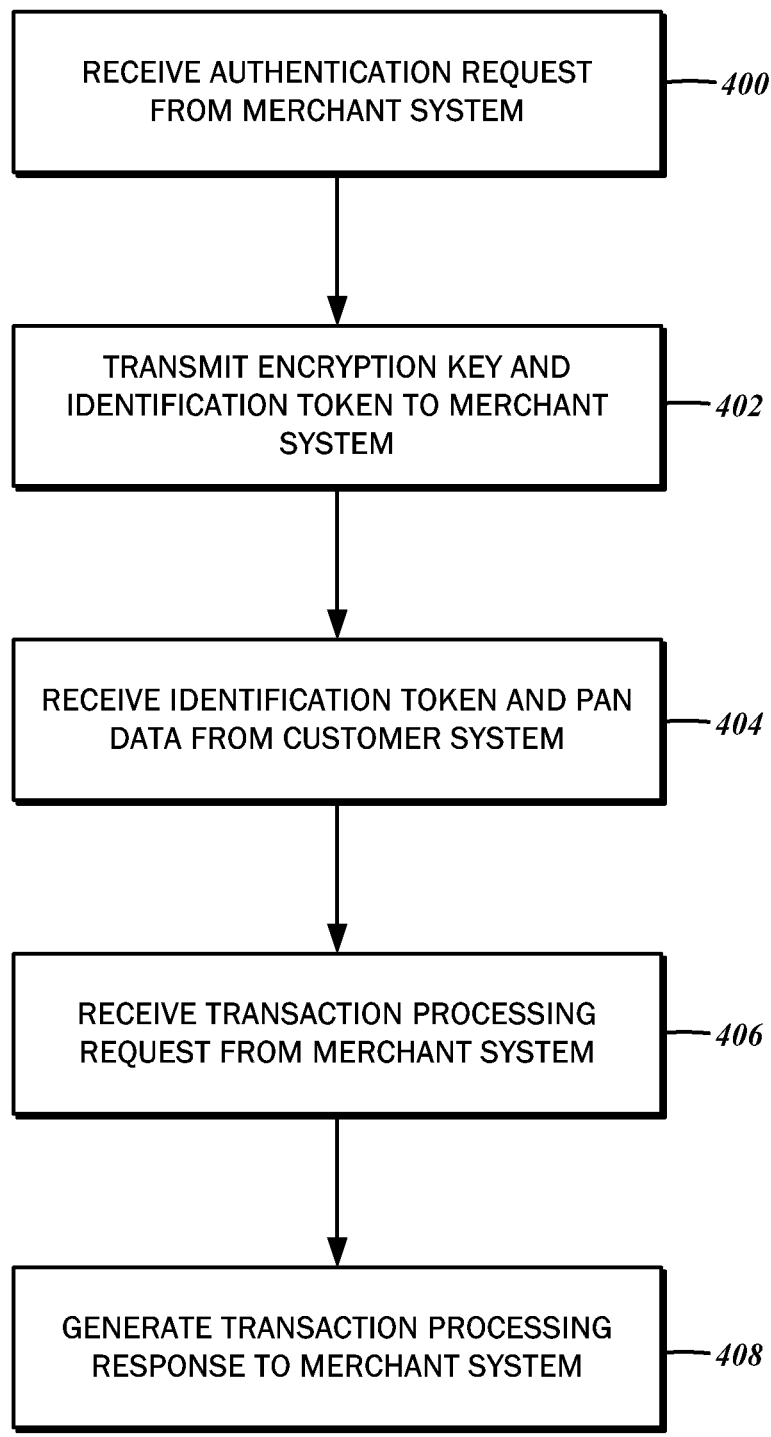
FIG. 5 is a flowchart showing another embodiment of the method for securely processing an online transaction as implementable on a third party, payment processor system.

Next, referring to the flowchart of FIG. 5, yet another embodiment of the method for securely processing the online transaction from the perspective of the payment processor system 28 is described. More particularly, there is a step 400 of receiving the authentication request 48 on the payment processor system 28, which is reciprocal to the step 302 of transmitting the transaction submission request 42 described above. In response to the received authentication request 48, the payment processor system 28 generates a unique public encryption key 54 and an identification token 56. The public encryption key 54 is intended to be a one-time use, Rivest-Shamir-Adelman (RSA), 2048 bit long key. However, any other suitable public key encryption modality may be utilized. The identification token 56 is understood to be a unique identifier that is matched to the received authentication request 48, and specifically the transaction identifier 50 thereof. It is understood that a separate identification token 56 distinct from the encryption key 54 is optional, and the encryption key 54 may practically serve as one, since it is generated for each different transaction. The encryption key 54 and the identification token 56 are stored by the payment processor system 28 for subsequent use, and are also, according to a step 402, transmitted to the merchant system 20. The communications between the merchant system 20 and the payment processor system 28 described above, including the transmission/receipt of the authentication request 48, the encryption key 54, and optionally the identification token 56, are understood to be over a prior established secure data transfer link. It is contemplated that the secure data transfer link is a secure sockets layer/transport layer security (SSL/TLS) connection.

Figure 6:
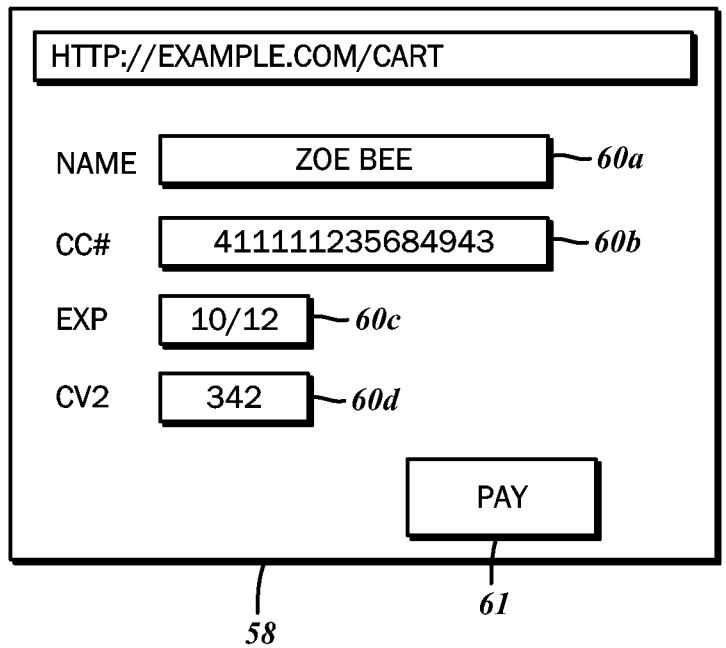
FIG. 6 is an example user interface of a payment information page for entering personal account number data in accordance with various embodiments of the present disclosure.

With reference again to the flowchart of FIG. 4, there is a reciprocal step 304, which is executed on the merchant system 20, of receiving the encryption key 54 and optionally, the identification token 56 from the payment processor system 28. As best shown in FIG. 1 and FIG. 6, the merchant system 20 generates a payment information form 58 that solicits the name of the customer 12 in a first field 60a, an account number for a payment modality to use in a second field 60b, the related expiration date for that payment modality in a third field 60c, and optionally, a verification code for the payment modality in a fourth field 60d. These fields and the data requested thereby are presented by way of example only, and any additional information may be solicited.

In accordance with step 306, the payment information form 58 is transmitted to the customer system 14 over a secure data transfer link established with the merchant system 20, and rendered by the web browser application 22. In this regard, the payment information form 58 is understood to have a browser-rendered markup segment 62 comprised of the various text and form input boxes. Additionally, the payment information form 58 may include an executable script 64, as well as the session token 56 and the public encryption key 54 received from the payment processor system 28 in step 304. In most cases, for the widest platform compatibility, the executable script 64 is written in JavaScript, though any other suitable scripting language may be substituted. An alternative embodiment contemplates the use of the executable script 64 to generate the browser-rendered markup segment 62. Because the payment information form 58 is generated by the merchant system 20, control over its contents and appearance is retained thereby. Thus, the look and feel of the website can remain consistent, and branding is not lost. As mentioned above, while the payment information form 58 is received and rendered by the web browser application 22 in some contemplated embodiments, other e-commerce client applications may be utilized.

Referring back to the flowchart of FIG. 3, the method from the perspective of the customer system 14 continues with a step 202 of receiving the payment information form 58, the encryption key 54, and optionally, the identification token 56 from the merchant system 20. As indicated above, the payment information form 58 is specifically generated for the transaction involving the customer 12 and not any others that may be simultaneously accessing the merchant system 20. Proper coordination in this regard may be achieved by correlating the transaction identifier 50 to the session token 56.

The method continues with a step 204 of receiving personal account number (PAN) data that is entered into the various fields 60a-d of the payment information form 58 by the customer 12. This data is understood to be sensitive and subject to various technological and legal protective measures to prevent its dissemination and abuse. In addition to PAN data, the payment information form 58 may request non-sensitive data pertinent to merchant system 20 for the transaction, and the step 204 also involves the receiving of such data.

According to a step 206, the entered PAN data is encrypted with the public encryption key 54 earlier received from the merchant system 20 via the payment information form 58. This step is initiated by the customer 12 upon a selection of the pay icon 61 on the payment information form 58. As indicated above, the payment information form 58 includes the executable script 64, and it is understood that this component performs the encryption step, among the other functions discussed previously. Those having ordinary skill in the art will recognize that there are several widely deployed public key encryption algorithms, and per the presently contemplated embodiment, the RSA algorithm may be used.

In a step 208, the encrypted PAN data 66, or ciphertext, and the previously received session token 56 are directly transmitted to the payment processor system 28 over the secure data transfer link established with the customer system 14. Referring back to FIG. 5, there is a reciprocal step 404 on the payment processor system 28 of receiving the session token 56 and the PAN data 66. It is understood that the web browser application 22 may otherwise raise exceptions to secondarily communicating with an alternative domain separate from that of the merchant system 20 in this fashion that may indicate security breaches. The payment information form 58 includes instructions that initiate the negotiation with the payment processor system 28 as described below. In employing this technique, it is understood that a separate HTML frame is not necessary.

Upon receipt by the payment processor system 28, the encrypted PAN data 66 and the session token 56 are temporarily stored for further processing that is initiated by the merchant system 20. Limits in relation to the time taken to complete this further processing are contemplated, and accordingly, a time-out or countdown timer is initiated. The expiration of the countdown timer is understood to generate an appropriate failure response to the merchant system 20. Furthermore, the payment processor system 28 notifies the customer system 14 as to its success or failure in receiving and storing the encrypted PAN data 66 and the session token 56.

If the above steps are successful, that is, the customer system 14 receives a success message from the payment processor system 28, the method continues with a step 210 of transmitting non-sensitive transaction data 68 to the merchant system 20. If a failure message from the payment processor system 28 is received, the executable script 64 may re-attempt the upload process. The number of re-attempts may be preset. As utilized herein, the non-sensitive transaction data 68 is understood to be any other data that is not considered to be the PAN data 66, and not subject to the restrictions mentioned above. This may have been solicited via the payment information form 58 to the merchant system 20, or stored as variables of the payment information form 58 that are associated with various aspects of the transaction, for example, the transaction identifier 50. The step 210 has a reciprocal step 308 in relation to the merchant system 20, which involves receiving the transaction data 68 from the customer system 14.

With reference to the flowchart of FIG. 4, upon receiving the transaction data 68 from the customer system 14, the method executed by the merchant system 20 continues with a step 310 of transmitting, to the payment processor system 28, a transaction processing request 70. It is contemplated that the transaction processing request 70 also includes the transaction identifier 50 that is tied to the specific transaction with the customer 12. Additionally, to distinguish the particular merchant system 20, the transaction processing request 70 may also include the merchant identifier 51. The step 310 has a reciprocal step 406 involving the payment processor system 28 of receiving the transaction processing request 70 from the merchant system 20.

With the transaction identifier 50 and the merchant identifier 51, the specific transaction of concern is recognized by the payment processor system 28, including the earlier uploaded encrypted PAN data 66 from the customer system 14. In response to receiving the transaction processing request 70, the encrypted PAN data 66 is decrypted with a private key of the payment processor system 28. As will be recognized by those of ordinary skill in the art, data encrypted using the public key of a private-public key pair can decrypted by the corresponding private key. Based upon the specific instructions provided in the transaction processing request 70, several additional steps may be performed with the decrypted PAN data 66.

One contemplated step is processing the payment for completion of the transaction between the customer system 14 and the merchant system 20 using the provided PAN data 66. In one embodiment, the PAN data 66 is a credit card number, and so the payment processor system 28 contacts a credit card processing network 72, which debits the account associated with the customer 12 in an amount specified in the transaction processing request 70. Continuing with the exemplary shopping cart discussed above, a payment in the amount of $55 is requested. The account associated with the payment processor system 28 may be credited with the $55, which in turn is transferred to the merchant system by various means. Although not specifically described, alternative payment modalities such as personal check (and Advanced Clearing House or ACH) debit cards, which are separate from credit card processing networks, gift cards, and the like, are also contemplated. Those having ordinary skill in the art will recognize and be capable of implementing such alternative payment modalities if desired.

Another contemplated step is obtaining a transaction authorization confirmation for a financial account such as a credit card in the amount specified in the transaction processing request 70, and deferring the actual debit and credit of the account until a later time. Again, such functionality is known in the art, and can be readily implemented.

Yet another contemplated step is abandoning the transaction. Again, this instruction can be included in the transaction processing request 70.

Figure 7:
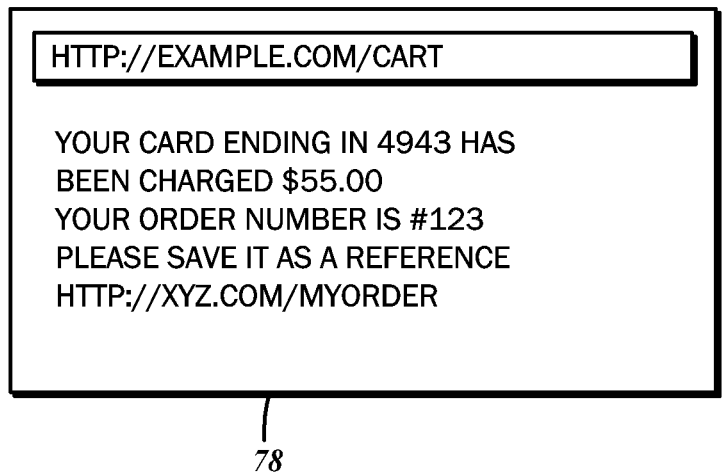
FIG. 7 is an example user interface of a receipt page following a successfully completed online transaction.

Upon a success or failure of the above steps or any other steps that can be initiated via the transaction processing request 70, per step 408, a transaction processing response 74 can be generated for the merchant system 20. With this response, the merchant system 20 can perform any one or combination of functions, broadly contemplated as a step 312 of generating a transaction processing response 76 to the customer system 14. As best illustrated in FIG. 7, one function following a success processing is generating a receipt page 78 that briefly identifies the payment modality utilized, the amount of the transaction, and a reference number for the transaction. Because the receipt page 78 is generated by the merchant system 20, the look and feel and branding can be retained.

In addition to generating a receipt page 78, various internal business functions of the merchant system 20 may be revised or updated based upon the transaction processing response 74. These include updating an inventory database with the sale, such that the purchased product is removed as an available item. Additionally, an accounting or revenue tracking system can be updated with the sale. Although specific internal business functions have been described, it will be appreciated that any other functions that depend upon the completion of a transaction following a payment may also be implemented.

In the even of a failure of the transaction processing request 70, the merchant system 20 can restart the processes described above and prompting the customer 12 to enter PAN data for an alternative payment modality, and so forth. Concurrently, an informative error message directing the customer 12 to attempt remedial action may be generated.

The particulars shown herein are by way of example only for purposes of illustrative discussion, and are presented in the cause of providing what is believed to be the most useful and readily understood description of the principles and conceptual aspects of the various embodiments set forth in the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method for securely processing an online transaction on a payment processor between a customer and a merchant, the method comprising:

receiving from a merchant system on the payment processor an authentication request including a transaction identifier associated with the online transaction;

generating a one-time use payment processor encryption key in response to the received authentication request, the one-time use payment processor encryption key corresponding to and associatively linked with the transaction identifier on the payment processor;

relaying the one-time use payment processor encryption key to a customer system through the merchant system;

receiving from the customer system over a direct secured communications link therewith bypassing the merchant system personal account data associated with the customer, the personal account data being encrypted on the customer system with the one-time use payment processor encryption key;

receiving a transaction processing request on the payment processor from the merchant system separately from the personal account data received from the customer system, the transaction processing request including the transaction identifier; and generating a transaction processing response to the merchant system based upon an execution of the transaction processing request with the received personal account data associated with the transaction identifier.

2. The method of claim 1, further comprising:

storing on the payment processor a private version of the one-time use payment processor encryption key relayed to the customer system;

decrypting on the payment processor, in response to receiving the transaction processing request, the personal account data with the private version of the one-time use payment processor encryption key corresponding to the transaction identifier.

3. The method of claim 2, wherein the transaction processing request includes a transaction sum, a debit in an amount thereof being requested from a financial account identified by the personal account data.

4. The method of claim 2, wherein the transaction processing request includes a transaction authorization confirmation for a financial account identified by the personal account data.

5. The method of claim 2, wherein the transaction processing request includes a transaction abandonment indicator.

6. The method of claim 1, further comprising:

transmitting an identification token corresponding to the transaction identifier with the transmission of the one-time use payment processor encryption key to the merchant system; and receiving the identification token from the customer system together with the received personal account data.

7. The method of claim 1, further comprising:

establishing a first secure data transfer link with the merchant system;

wherein the one-time use payment processor encryption key and the transaction processing response transmitted to the merchant system and the authentication request and the transaction processing request received from the merchant system are transferred over the first secure data transfer link.

8. The method of claim 1, further comprising:

initiating a session timer upon receiving the identification token and the personal account data from the customer system;

wherein a transaction processing response representative of a time-out being generated upon expiration of the session timer without receiving the transaction processing request.

9. A method for securely processing an online transaction between a customer and a merchant, the method comprising:

receiving from a customer system a transaction submission request for the online transaction including at least one purchase item identifier with a purchase price associated therewith;

transmitting an authentication request to a payment processing system in response to the receipt of the transaction submission request, the authentication request including a transaction identifier associated with the specific received transaction submission request;

receiving a one-time use payment processor encryption key from the payment processing system generated thereon in response to the received authentication request;

transmitting a payment information form with the transaction identifier and the one-time use payment processor encryption key to the customer system, the payment information form being receptive to personal account data and transaction data;

receiving the transaction data but not the personal account data entered into the payment information form on the customer system, the transaction data corresponding to the transaction identifier;

transmitting to the payment processing system, in response to receiving the transaction data from the customer system, a transaction processing request including the transaction identifier; and generating a transaction processing response to the customer system based upon results for the transaction processing request to the payment processing system.

10. The method of claim 9, wherein the payment information form includes a script with executable instructions for initiating encryption of the personal account data entered into the payment information page with the received encryption key.

11. The method of claim 9, wherein the transaction processing response is a success message, the results for the transaction processing request from the payment processing system indicating a success.

12. The method of claim 9, further comprising:
updating the merchant system upon a successful completion of the online transaction.

13. The method of claim 9, wherein the transaction processing response is a failure message, the results for the transaction processing request from the payment processing system indicating a failure.

14. A method for securely processing an online transaction between a customer and a merchant, the method comprising:
transmitting to a merchant system a transaction submission request for the online transaction including at least one purchase item identifier with a purchase price associated therewith;
receiving a payment information form including a one-time use payment processor encryption key generated by a payment processing system and relayed through the merchant system, and further corresponding to a transaction identifier for the online transaction;
receiving personal account data and transaction data entered into the payment information form;
encrypting the personal account data with the received encryption key;
transmitting the encrypted personal account data to the payment processing system;
transmitting the transaction data but not the encrypted personal account data to the merchant system.

15. The method of claim 14, wherein the payment information form includes a script with executable instructions for encrypting the personal account data entered into the payment information form with the received one-time use payment processor encryption key.

16. The method of claim 14, further comprising:
receiving an identification token corresponding to the transaction identifier with along with the receiving of the one-time use payment processor encryption key from the merchant system; and
transmitting the identification token from the customer system together with the transmitting of the personal account data.

17. An article of manufacture comprising a program storage medium readable by a data processing apparatus, the medium tangibly embodying one or more programs of instructions executable by the data processing apparatus to perform a method for securely processing an online financial transaction between a customer and a merchant, the method comprising:
receiving from a customer system a transaction submission request for the online transaction including at least one purchase item identifier with a purchase price associated therewith;
transmitting an authentication request to a payment processing system in response to the receipt of the transaction submission request, the authentication request including a transaction identifier associated with the specific received transaction submission request;
receiving a one-time use payment processor encryption key from the payment processing system generated thereon in response to the received authentication request;
transmitting a payment information form with the transaction identifier and the one-time use payment processor encryption key to the customer system, the payment information form being receptive to personal account data and transaction data;
receiving the transaction data but not the personal account data entered into the payment information form on the customer system, the transaction data corresponding to the transaction identifier;
transmitting to the payment processing system, in response to receiving the transaction data from the customer system, a transaction processing request including the transaction identifier; and
generating a transaction processing response to the customer system based upon results for the transaction processing request to the payment processing system.

18. The article of manufacture of claim 17, wherein the payment information form includes a script with executable instructions for encrypting personal account data entered into the payment information form with the received one-time use payment processor encryption key.

* * * * *